United States Patent
Moriguchi et al.

[11] Patent Number: 6,054,674
[45] Date of Patent: Apr. 25, 2000

[54] DC POWER SUPPLY APPARATUS FOR ARC-UTILIZING APPARATUSES

[75] Inventors: Haruo Moriguchi, Itami; Tetsuro Ikeda, Osaka; Toshikazu Fujiyoshi, Kawanishi; Kenzo Danjo, Kyoto-fu; Kunio Karino, Suita; Hideo Ishii, Minoo, all of Japan

[73] Assignee: Sansha Electric Manufacturing Company, Limited, Osaka, Japan

[21] Appl. No.: 09/231,892

[22] Filed: Jan. 14, 1999

[30] Foreign Application Priority Data

Jan. 16, 1998 [JP] Japan .................................. 10-020400

[51] Int. Cl.⁷ ...................................................... B23K 9/10
[52] U.S. Cl. ........................................ 219/130.21; 363/142
[58] Field of Search ........................... 219/130.21, 130.1, 219/130.51, 137 PS; 363/142, 143

[56] References Cited

U.S. PATENT DOCUMENTS

| 5,272,313 | 12/1993 | Karino et al. ........................ 219/130.21 |
| 5,310,992 | 5/1994 | Karino et al. ........................ 219/130.21 |
| 5,319,533 | 6/1994 | Reynolds et al. .................. 219/137 PS |
| 5,824,990 | 10/1998 | Geissler et al. ..................... 219/130.21 |

FOREIGN PATENT DOCUMENTS 3-71218 11/1991 Japan .
2573123 10/1996 Japan .

Primary Examiner—Clifford C. Shaw
Attorney, Agent, or Firm—Duane, Morris & Heckscher LLP

[57] ABSTRACT

An AC voltage applied among power input supply terminals is rectified by a rectifier, and the rectified voltage is adapted to be reduced in a voltage-reducing converter with a switch connected in parallel with it. A switching circuit connect smoothing capacitors in series or parallel to the voltage-reducing converter. Inverters are connected in parallel with the respective smoothing capacitors. The output voltages of the inverters are voltage-transformed by transformers. The transformed voltages from the transformers are converted to DC voltages by converters. A control unit renders the voltage-reducing converter operative and causes the switching circuit to connect the smoothing capacitors in series when a third AC voltage is applied among the power supply input terminals. When a second AC voltage lower than the third AC voltage is applied among the power supply input terminals, the control unit causes the switch connected in parallel with the voltage-reducing converter to be closed and causes the switching circuit to connect the smoothing capacitors in series. If a first AC voltage about one-half as high as the second AC voltage is applied, the control unit causes the switch to be closed and causes the switching circuit to connect the smoothing capacitors in parallel.

6 Claims, 4 Drawing Sheets

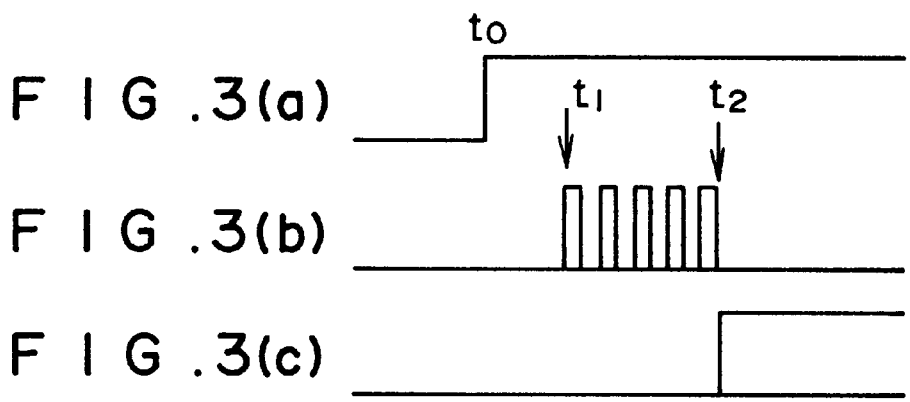
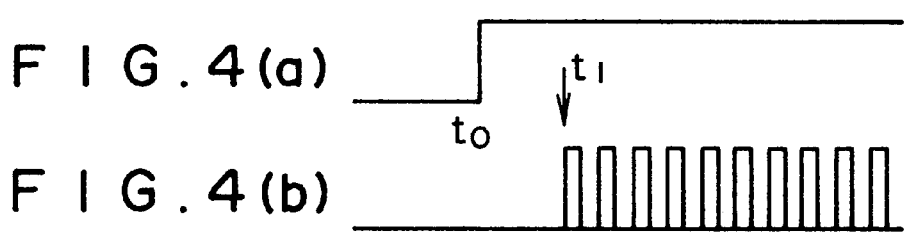

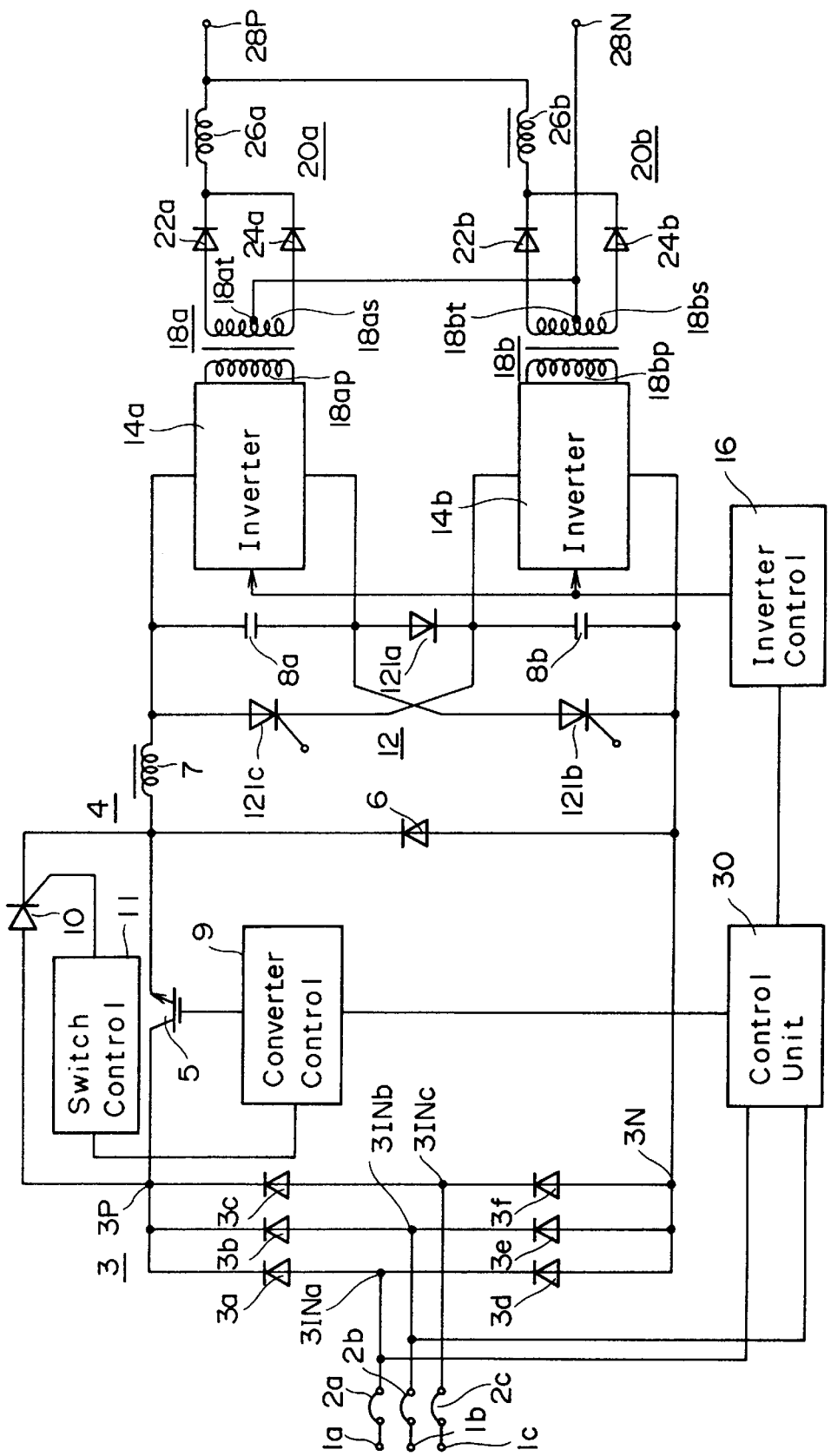
F I G. 5

DC POWER SUPPLY APPARATUS FOR ARC-UTILIZING APPARATUSES

This application is based on Japanese Patent Application No. HEI 10-20400 filed on Jan. 16, 1998, which is incorporated herein by reference.

The present invention relates to a DC power supply apparatus for use with arc-utilizing apparatuses, such as an arc welder, an arc cutter and an arc lamp activating apparatus, and, more particularly, to such apparatus which is operable from one selected from two or more voltages having different magnitudes.

BACKGROUND OF THE INVENTION

Some of DC power supply apparatuses useable with arc-utilizing apparatuses are arranged to supply a DC voltage prepared by converting a commercial AC voltage. Commercial AC voltages in the worlds have various values. Such AC voltages may be classified into two categories, namely, a higher voltage group and a lower voltage group. The higher voltage group includes voltages of, for example, 380 V, 400 V, 410 V and 460 V, whereas the lower voltage group includes voltages of, for example, 200 V, 208 V, 230 V and 240 V. One of voltages of either higher voltage group or lower voltage group may be used in one country, but some countries may use, for example, voltages selected from each of the higher and lower voltage groups. In such countries or areas, it sometimes is difficult to determine which type of DC power supply apparatuses should be used, a DC power supply apparatus which is operable from a voltage of the higher voltage group or a DC power supply apparatus operable from a voltage of the lower voltage group.

Therefore, there is a need for a DC power supply apparatus which can operate from a voltage of either the higher or lower voltage group.

One example of such DC power supply apparatuses is disclosed in U.S. Pat. No. 5,272,313 issued to Karino et al. on Dec. 21, 1993. The DC power supply apparatus disclosed in this U.S. patent includes an input-side rectifier, which rectifies an input commercial AC voltage of, for example, 400 V or 200 V to a DC voltage. If the applied input AC voltage is a 400 V voltage, the rectified output voltage from the input-side rectifier is applied across a series combination of two capacitors. On the other hand, if the applied voltage is a 200 V voltage, the two capacitors are connected in parallel with each other, and the input-side rectifier output voltage is applied across the parallel combination of the two capacitors. The two capacitors smooth the applied rectifier output voltage, and the smoothed voltage across each of the capacitors is converted to a high frequency voltage in an inverter associated with that capacitor. The high frequency voltages from the two inverters are voltage-transformed by respective ones of two transformers, and the voltage-transformed voltages are rectified by an output-side rectifier.

The DC power supply apparatus disclosed in this U.S. patent can be modified so that it is usable in areas where a commercial AC voltage available is of either 230 V or 460 V. There are areas, however, in which a voltage of 575 V is used.

When the DC power supply apparatus operable from either 460 V or 230 V is used with a voltage of 575 V, the voltage resulting from the input AC voltage of 575 V rectified in the input-side rectifier should be smoothed by the series combination of the two capacitors and the voltage across each of the capacitors should be applied to the associated one of the inverters.

Assuming that the input AC voltage of 575 V to the DC power supply apparatus can vary by 12%, the peak value of the output voltage from the input-side rectifier is (575×1.12×√2)≅900 volts. Then, one-half of the peak value, i.e. about 450 V, is applied to each of semiconductor switching devices of each inverter. The maximum voltage rating of commercially available semiconductor switching devices is either 600 V or 1200 V. If a DC power supply apparatus with semiconductor switching devices for 600 V is used with an 575 V input commercial AC voltage, the withstand voltage of the semiconductor switching devices is too low, and, therefore, devices for 1200 V must be used. However, semiconductor switching devices for 1200 V are much expensive relative to devices for 600 V. In addition, inverters requires many semiconductor switching devices. Accordingly, the cost of such DC power supply apparatuses undesirably increases.

In order to overcome the above-described problem, it may be considered not to couple the 575 V input AC voltage to the serially connected capacitors across which the 460 V voltage would otherwise be applied, but to provide an additional circuit for converting the 575 V AC voltage to a DC voltage in addition to the above-described arrangement including the input-side rectifier, the capacitors, the inverters, the transformers and the output-side rectifier.

Assuming both the 575 V and 460 V AC voltages change by ±12%, the lowest possible value of the 575 V voltage is 506 (=575×0.88) volts, whereas the highest possible value of the 460 V voltage is 515 (=460×1.12) volts. That is, the variation ranges of the two voltages overlap. It is quite uneconomical to provide separate AC-to-DC converter circuits dedicated for the two voltages whose variation ranges overlap.

Japanese Patent No. 2,573,123 granted on Oct. 24, 1996, the grant being published on Jan. 22, 1997, discloses a DC power supply apparatus in which part of components are used in common for voltages whose variation ranges overlap.

According to the invention disclosed in this Japanese patent, however, regardless of whether the input AC voltage is of 575 V or 460 V, the DC power supply apparatus is arranged to supply a constant voltage to accessories, such as a fan for cooling the DC power supply apparatus and a wire feeding motor of an arc welder, but it does not switch major constituent circuits, e.g. inverters, of the DC power supply apparatus in accordance with the magnitude of the input AC voltage to supply the constant voltage.

Furthermore, no DC power supply apparatus has been proposed yet, which can be operable from any voltage selected from the lower voltage group including 200 V, 208 V, 230 V and 240 V voltages, a voltage in the higher voltage group including 380 V, 400 V, 410 V and 460V voltages, and a further higher voltage group including a 575 V voltage.

An object of the present invention is to provide a DC power supply apparatus for arc-utilizing apparatuses, which is operable from any one of voltages in the lower, higher and still higher voltage groups.

SUMMARY OF THE INVENTION

A DC power supply apparatus according to the present invention includes an power supply input terminal for receiving a selected one of a first AC voltage, a second AC voltage about twice higher than the first AC voltage and a third AC voltage higher than the second AC voltage. A rectifier rectifies the AC voltage received at the power supply input terminal. An output voltage from the rectifier is applied to a voltage-reducing converter where it is reduced. A switch is coupled in parallel with the voltage-reducing converter. A first switching circuit connects first and second smoothing capacitors either in series or parallel with each other between output terminals of the voltage-reducing converter. First and second DC-to-high-frequency converter circuits are connected across the first and second smoothing capacitors, respectively. High-frequency outputs from the first and second DC-to-high-frequency converter circuits are coupled to first and second transformers, respectively. High-frequency outputs from the first and second transformers are converted into DC voltages in high-frequency-to-DC converter circuits.

When the third AC voltage is applied to the power supply input terminal of the DC power supply apparatus, a control unit causes the voltage-reducing converter to operate and also causes the first switching circuit to connect the first and second smoothing capacitors in series. When the second AC voltage is applied to the power supply input terminal, the control unit causes the switch to be closed and also causes the first switching circuit to connect the first and second smoothing capacitors in series with each other. If the AC voltage applied to the power supply input terminal is the first AC voltage, the control unit causes the switch to be closed and also causes the first switching circuit to connect the first and second smoothing capacitors in parallel.

When the first AC voltage is supplied to the power supply input terminal, the two capacitors are connected in parallel, whereas they are connected in series when the second AC voltage about twice as high as the first AC voltage is applied. Accordingly, the voltage developed across each of the two smoothing capacitors when the first AC voltage is applied to the power supply input terminal is approximately equal to the voltage developed when the second AC voltage is applied.

If the third AC voltage is applied to the power supply input terminal, the voltage-reducing converter reduces the voltage resulting from rectifying the third AC voltage to a voltage substantially equal to, for example, the voltage resulting from rectifying the second AC voltage. When the third AC voltage is applied, the two smoothing capacitors are connected in series. Accordingly, the voltage developed across each of the two capacitors is substantially the same whichever AC voltage is applied to the power supply input terminal. This means that whichever AC voltage is applied to the power supply input terminal, the voltage applied to each of semiconductor switching devices of the respective DC-to-high-frequency converter circuits remains substantially constant, and, therefore, the DC power supply apparatus according to the present invention can convert any one of the three AC voltages into a DC voltage.

Thus, according to the present invention, need for using a separate arrangement dedicated for converting each of the three input AC voltages into DC is eliminated, and also there is no need for using high voltage withstand semiconductor switching devices in the DC-to-high-frequency converter circuits, which must otherwise withstand the high voltage resulting from rectifying the third AC voltage.

When the first or the second AC voltage is applied to the power supply input terminal, the switch connected in parallel with the voltage-reducing converter may be closed only after the voltage-reducing converter is operated for a predetermined time period. When the first or the second AC voltage is inputted, the voltage-reducing converter operates for the predetermined time period to pre-charge the two smoothing capacitors connected in parallel or series, and after that, the switch is closed to charge the smoothing capacitors from the output voltage from the rectifier. Accordingly, it never happens that charging current abruptly flows into the smoothing capacitors.

The voltage-reducing converter may be so arranged as to reduce the third AC voltage to a voltage lower than the voltage to which the voltage-reducing converter normally reduces the rectified version of the third AC voltage, for a predetermined time period from the start of its operation. The voltage normally provided by the voltage-reducing converter is approximately equal to the voltage resulting from rectifying the second AC voltage.

The control unit may be provided with control unit input terminals between which the first, the second or the third AC voltage is adapted to be applied. The control unit also includes a control transformer. The control transformer has first, second and third primary winding and first and second secondary windings. The control unit further includes a second switching circuit, which selectively connects the first, second and third primary windings in series, connects the first and second primary windings in series, and connects the first and second primary windings in parallel. An accessory of the DC power supply apparatus is supplied with power from the first secondary winding. The control unit also includes a comparator circuit.

The comparator circuit causes the first switching circuit to connect the first and second smoothing capacitors in series with each other, causes the voltage-reducing converter to operate, and also causes the second switching circuit to connect the first, second and third primary windings of the control transformer in series when the voltage developed across the second secondary winding is higher than a first value between values corresponding to the second and third AC voltages. If the voltage across the second secondary winding of the control transformer is lower than the first value and higher than a second value between a value corresponding to the first AC voltage and the value corresponding to the second AC voltage, the comparator circuit causes the first switching circuit to connect the two smoothing capacitors in series, causes the switch connected in parallel with the voltage-reducing converter to be closed, and causes the second switching circuit to connect the first and second primary windings of the control transformer in series. The comparator circuit further operates to cause the first switching circuit to connect the two smoothing capacitors in parallel, to close the switch and to cause the second switching circuit to connect the first and second primary windings in parallel when the voltage induced in the second secondary winding is lower than the second value.

With the above-described arrangement of the control unit, a voltage is induced across the first secondary winding and applied to the accessory whichever voltage, namely, the first, the second or the third AC voltage is applied to the power supply input terminal of the DC power supply apparatus.

The numbers of turns of the first, second and third primary windings and the number of turns of the first secondary winding of the control transformer may be selected such that a voltage of the same magnitude is developed across the first secondary winding when the third AC voltage is applied between the control unit input terminals with the first, second and third primary windings connected in series between the control unit input terminals, when the second AC voltage is applied between the control unit input terminals with the first and second primary windings connected in series between the control unit input terminals, or when the first AC voltage is applied between the control unit input terminals with the first and second primary windings connected in parallel between the control unit input terminals.

The second switching circuit is adapted to receive first and second switching signals. When neither first nor second switching signal is applied to the second switching circuit, it connects the first, second and third primary windings of the control transformer in series between the control unit input terminals. When the first switching signal is applied to it, while the second switching signal is not applied, the second switching circuit connects the first and second primary windings in series between the control unit input terminals. With both the first and second switching signals applied to the second switching circuit, the second switching circuit connects the first and second primary windings in parallel between the control unit input terminals. The voltage-reducing converter operates in relation to the non-application of the first switching signal. The switch connected in parallel with the voltage-reducing converter is closed when the first switching signal is applied to the second switching circuit.

The comparator circuit may comprise first and second comparator sections. The first comparator section produces the first switching signal when the voltage across the second secondary winding is lower than the above-mentioned first value, but it does not produce the first switching signal when the voltage across the second secondary winding is higher than the first value. The second comparator section operates when the first switching signal is present. The second comparator section produces the second switching signal when the voltage across the second secondary winding is lower than the above-mentioned second value, but does not produce the second switching signal when the voltage across the second secondary winding is higher than the second value.

The second comparator section is arranged to compare the voltage across the second secondary winding with the second value only when the first comparator section produces the first switching signal. Accordingly, the comparator circuit can be simple. If, for example, the voltage across the second secondary winding were compared with the first value in one comparator and were compared with the second value in another comparator, an additional processing circuit would be required for selectively producing the first and second switching signals on the basis of the results of the comparison made in the two comparators. The present invention can eliminate such processing circuit.

The first and second comparator sections may be arranged to hold the first and second switching signals, respectively. Since the first and second switching signals are held, the switched states are maintained even when the voltage applied from the second secondary winding to the first and second comparator sections varies due to the switching operation of the first and second switching circuits.

BRIEF DESCRIPTION OF THE DRAWINGS

FIGS. 3(a), 3(b) and 3(c) are waveforms for use in explaining the operations of a voltage-reducing converter and a thyristor used in the DC power supply apparatus shown in FIG. 1 when a first or a second voltage is applied to the DC power supply apparatus.

FIGS. 4(a) and 4(b) are waveforms for use in explaining the operation of the voltage-reducing converter when a third voltage is applied to the DC power supply apparatus.

FIG. 5 is a circuit diagram of a DC power supply apparatus for a DC arc welder according to a second embodiment of the present invention.

DETAILED DESCRIPTION OF EMBODIMENTS

Figure 1:
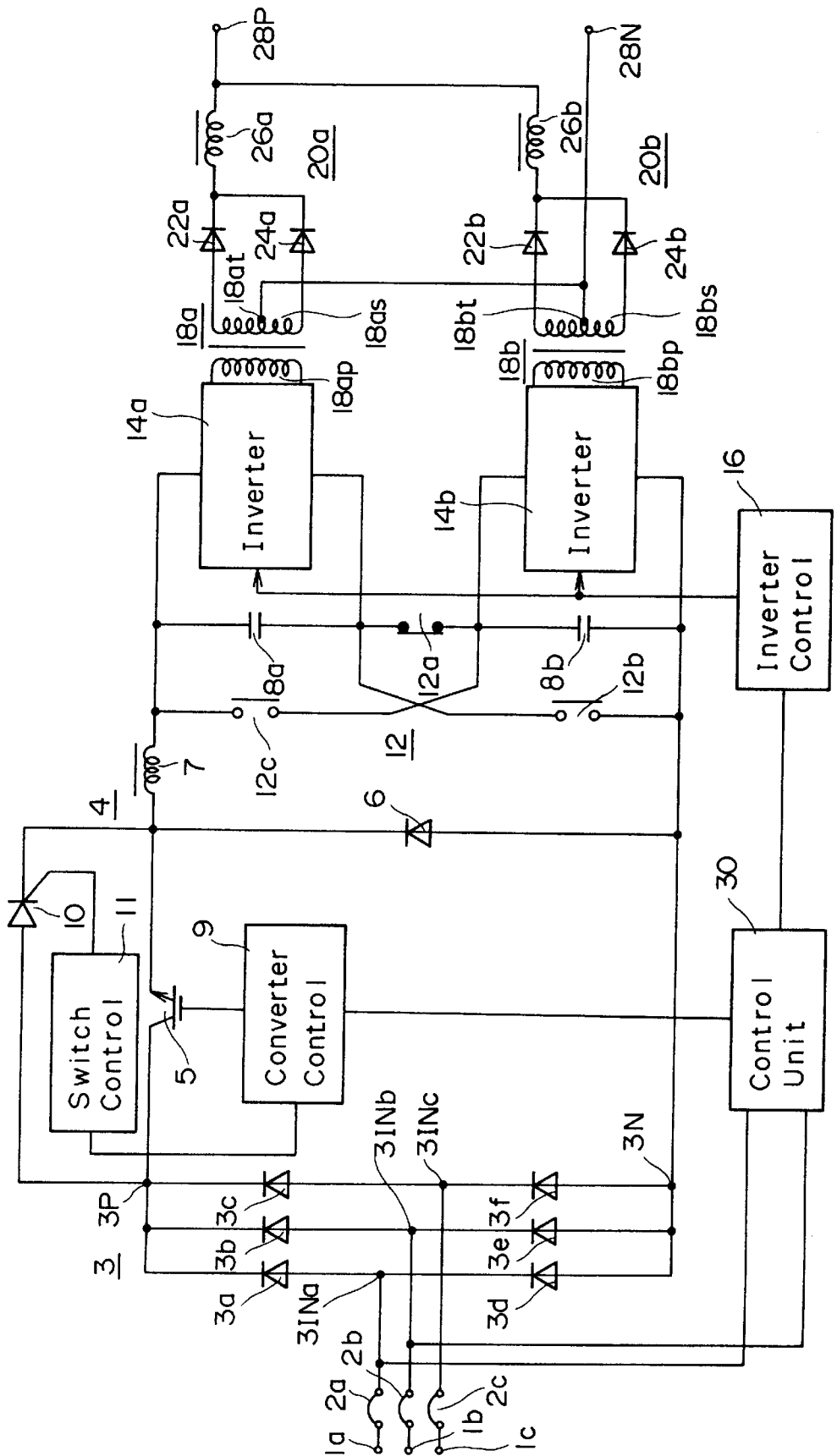
FIG. 1 is a circuit diagram of a DC power supply apparatus for use with a DC arc welder according to an embodiment of the present invention.

FIG. 1 shows a DC power supply apparatus for arc-utilizing apparatuses according to one embodiment of the present invention. The DC power supply apparatus has power supply input terminals 1a, 1b and 1c for receiving a three-phase commercial AC voltage from one of first, second and third three-phase AC power supplies. The first AC supply supplies a first voltage which is one of voltages of, for example, 200 V, 208 V, 230 V and 240 V, and the second AC power supply supplies a second voltage which is one of voltages of, for example, 380 V, 400 V, 410 V and 460 V. The third AC supply supplies a third voltage of, for example, 575 V. As will be understood, the first voltage is about one-half the corresponding second voltage.

The input terminals 1a, 1b and 1c are coupled through respective switches 2a, 2b and 2c to input nodes 3INa, 3INb and 3INc, respectively of an input-side rectifier circuit 3. The rectifier circuit 3 is a full-wave rectifier circuit, which includes diodes 3a, 3b, 3c, 3d, 3e and 3f. The diodes 3a, 3b and 3c have their anodes connected to the input nodes 3INa, 3INb and 3INc, respectively, and have their cathodes connected to a positive output node 3P of the rectifier circuit 3. The diodes 3d, 3e and 3f have their cathodes connected to the input nodes 3INa, 3INb and 3INc, respectively, and have their anodes connected to a negative output node 3N.

A voltage-reducing converter 4 is connected between the output nodes 3P and 3N of the input-side rectifier circuit 3. The voltage-reducing converter 4 includes a semiconductor switching device, e.g. IGBT 5, whose collector is connected to the positive output node 3P of the input-side rectifier 3. The emitter of the IGBT 5 is connected to the cathode of a current-circulating diode 6, of which the anode is connected to the negative output node 3N of the input-side rectifier circuit 3.

The emitter of the IGBT 5 is also connected through a reactor 7 to a load, i.e. a pair of smoothing capacitors 8a and 8b. The gate of the IGBT 5 is adapted to receive a control signal intermittently applied to it from a converter control circuit 9.

The IGBT 5 is rendered conductive when the control signal is applied to its gate from the converter control circuit 9. Then, current flows through the reactor 7 to store energy in the reactor 7. The IGBT 5 is rendered nonconductive when the control signal is removed from its gate, resulting in the discharging of the energy stored in the reactor 7. The output voltage of the input-side rectifier circuit 3 is reduced by regulating the conduction period of the IGBT 5, and the reduced voltage is applied to the smoothing capacitors 8a and 8b.

A switch, which may be a semiconductor switching device, e.g. a thyristor 10, is connected in parallel with the emitter-collector conduction path of the IGBT 5. The thyristor 10 is rendered conductive when a thyristor control signal is applied to it from a switch control circuit 11, which, in turn, is operative when it is supplied with power from the converter control circuit 9.

A first switching circuit 12 selectively connects the smoothing capacitors 8a and 8b in series and in parallel with each other. Specifically, the first switching circuit 12 includes a normally closed contact 12a and normally open contacts 12b and 12c. The normally closed contact 12a is connected between the smoothing capacitors 8a and 8b so as to connect the capacitors 8a and 8b in series. The series combination of the smoothing capacitors 8a and 8b and the normally closed contact 12a is connected between one end remote from the IGBT 5 of the reactor 7 and the negative output node 3N of the input-side rectifier circuit 3. The junction of the capacitor 8a and the normally closed contact 12a is connected through the normally open contact 12b to the negative output node 3N. Also, the junction of the capacitor 8b and the normally closed contact 12a is connected to the reactor 7 via the normally open contact 12c.

Thus, with the normally closed contact 12a closed and with the normally open contacts 12b and 12c opened, the smoothing capacitors 8a and 8b are connected in series. On the other hand, when the normally closed contact 12a is opened and the normally open contacts 12b and 12c are closed, the smoothing capacitors 8a and 8b are connected in parallel. The normally closed contact 12a and the normally open contacts 12b and 12c are opened and closed by signals from a later-mentioned comparator circuit 46. When the comparator circuit 46 is generating no switching signal, the normally closed contact 12a is closed with the normally open contacts 12b and 12c opened, so that the smoothing capacitors 8a and 8b are connected in series with each other.

DC-to-high-frequency converters, e.g. inverters, 14a and 14b are connected in parallel with the smoothing capacitors 8a and 8b, respectively. Each inverter includes a plurality of semiconductor switching devices, e.g. IGBTs, which are connected in a known full-bridge or half-bridge configuration. The IGBTs repeat alternate conduction and nonconduction in response to independently applied IGBT control signals for the respective IGBTs from an inverter control circuit 16 so that the DC voltages from the smoothing capacitors 8a and 8b are converted into respective high-frequency voltages.

The high-frequency voltages from the inverters 14a and 14b are applied to primary windings 18ap and 18bp of transformers 18a and 18b, respectively. Then, voltage-transformed high-frequency voltages are induced in secondary windings 18as and 18bs of the respective transformers 18a and 18b.

Output-side rectifier circuits 20a and 20b are connected to the secondary windings 18as and 18bs, respectively. The output-side rectifier circuit 20a includes diodes 22a and 24a having their anodes connected to one and the other ends of the secondary winding 18as, and having their cathodes connected together to a positive output terminal 28P of the DC power supply apparatus through a smoothing reactor 26a.

Similarly, the output rectifier circuit 20b includes diodes 22b and 24b having their anodes connected to one and the other ends of the secondary winding 18bs, and having their cathodes connected together to the positive output terminal 28P through a smoothing reactor 26b.

Intermediate taps 18at and 18bt are disposed on the secondary windings 18as and 18bs, respectively, which are connected together to a negative output terminal 28N of the DC power supply apparatus.

The high-frequency voltages induced in the secondary windings 18as and 18bs of the transformers 18a and 18b are rectified in the output-side rectifier circuits 20a and 20b and smoothed by the smoothing reactors 26a and 26b, and an output voltage is developed between the output terminals 28P and 28N. The DC voltage developed between the output terminals 28P and 28N is applied to a load (not shown) connected between the output terminals. For example, a workpiece and a torch of an arc welder are connected between the output terminals 28P and 28N, and the DC voltage causes an arc to be generated between the workpiece and the torch.

Operating voltages for the voltage-reducing converter control circuit 9 and the inverter control circuit 16 are supplied by a control unit 30. The control unit 30 is connected through the switches 2a and 2b to the input terminals 1a, and 1b, respectively, and produces the operating voltages for the control circuits 9 and 16 from the voltage between the input terminals 1a, and 1b.

The control unit 30 determines which one of the voltages is being applied between the input terminals 1a, and 1b, the first voltage, the second voltage or the third voltage, and controls the first switching circuit 12, the voltage-reducing converter 4 and the thyristor 10 in accordance with the determined voltage.

When the first voltage is applied between the input terminals 1a, and 1b, the control unit 30 controls the first switching circuit 12 to operate to connect the smoothing capacitors 8a and 8b in parallel with each other and also controls the voltage-reducing converter 4 to operate for a predetermined time period. After that, the voltage-reducing converter 4 is caused to stop operating, and the thyristor 10 is rendered conductive. This causes a voltage resulting from the rectification of the first voltage to be applied to the parallel combination of the smoothing capacitors 8a and 8b. The applied voltage is smoothed by the capacitors 8a and 8b, and the smoothed voltages across the capacitors 8a and 8b are applied to the inverters 14a and 14b for conversion to high-frequency voltages. The high-frequency voltages from the inverters 14a and 14b are voltage-transformed respectively in the voltage-transformers 18a and 18b. The voltage-transformed, high-frequency voltages induced in the secondary windings 18as and 18bs are rectified respectively by the output-side rectifier circuits 20a and 20b. The rectified voltages are smoothed respectively by the smoothing reactors 26a and 26b and applied to the output terminals 28P and 28N, respectively.

If the voltage applied between the input terminals 1a, and 1b is the second voltage, the control unit 30 controls the first switching circuit 12 so as to connect the smoothing capacitors 8a and 8b in series with each other. The voltage-reducing converter 4 is caused to operate for a predetermined time period. Then, the voltage-reducing converter 4 is stopped, and the thyristor 10 is rendered conductive instead, whereby a voltage resulting from the rectifying the second voltage is applied to the series combination of the capacitors 8a and 8b. Because the capacitors 8a and 8b are connected in series, the voltage across each of the smoothing capacitors 8a and 8b is approximately equal to the voltage appearing when the first voltage is applied to the input terminals 1a–1c. In a manner similar to the case in which the first voltage is applied, a DC voltage is developed between the output terminals 28P and 28N.

If the voltage resulting from rectifying the first or the second input voltage were applied to the smoothing capacitors 8a and 8b with no charge thereon, a large current would flow into the capacitors 8a and 8b. In order to prevent such large current from flowing into the capacitors, the rectified version of the first or the second voltage is applied only after the capacitors 8a and 8b have been partly charged from the voltage reduced in the voltage-reducing converter 4.

If the input voltage applied between the input terminals 1a, and 1b is the third voltage, the first switching circuit 12 is operated to connect the smoothing capacitors 8a and 8b in series with each other. The voltage resulting from rectifying the third input voltage is reduced to the value of the voltage resulting from rectifying the second input voltage in the voltage-reducing converter 4, and the reduced voltage is applied to the series combination of the smoothing capacitors 8a and 8b. Thus, the voltage across each of the smoothing capacitors 8a and 8b is approximately equal to the value of the voltage appearing when the second input voltage is applied to the input terminals 1a–1c. In a manner similar to the case where the second input voltage is applied to the input terminals 1a–1c, a DC voltage is developed between the output terminals 28P and 28N of the DC power supply apparatus.

The voltage-reducing converter 4 may be arranged such that when the third voltage is applied to the apparatus, it operates first to reduce the third voltage to a voltage lower than the voltage resulting from rectifying the second voltage for a predetermined time period and, then, to reduce it to a voltage equal to the voltage resulting from rectifying the second voltage.

Since the third voltage is reduced to a voltage approximately equal to the voltage resulting from rectifying the second voltage before applying it to the inverters 14a and 14b, there is no need to provide a separate AC-to-DC converter dedicated to the third voltage. Also, it is not necessary to use expensive devices which can withstand such a high voltage as resulting from rectifying the third voltage of, for example, 575 V, in the inverters 14a and 14b.

Figure 2:
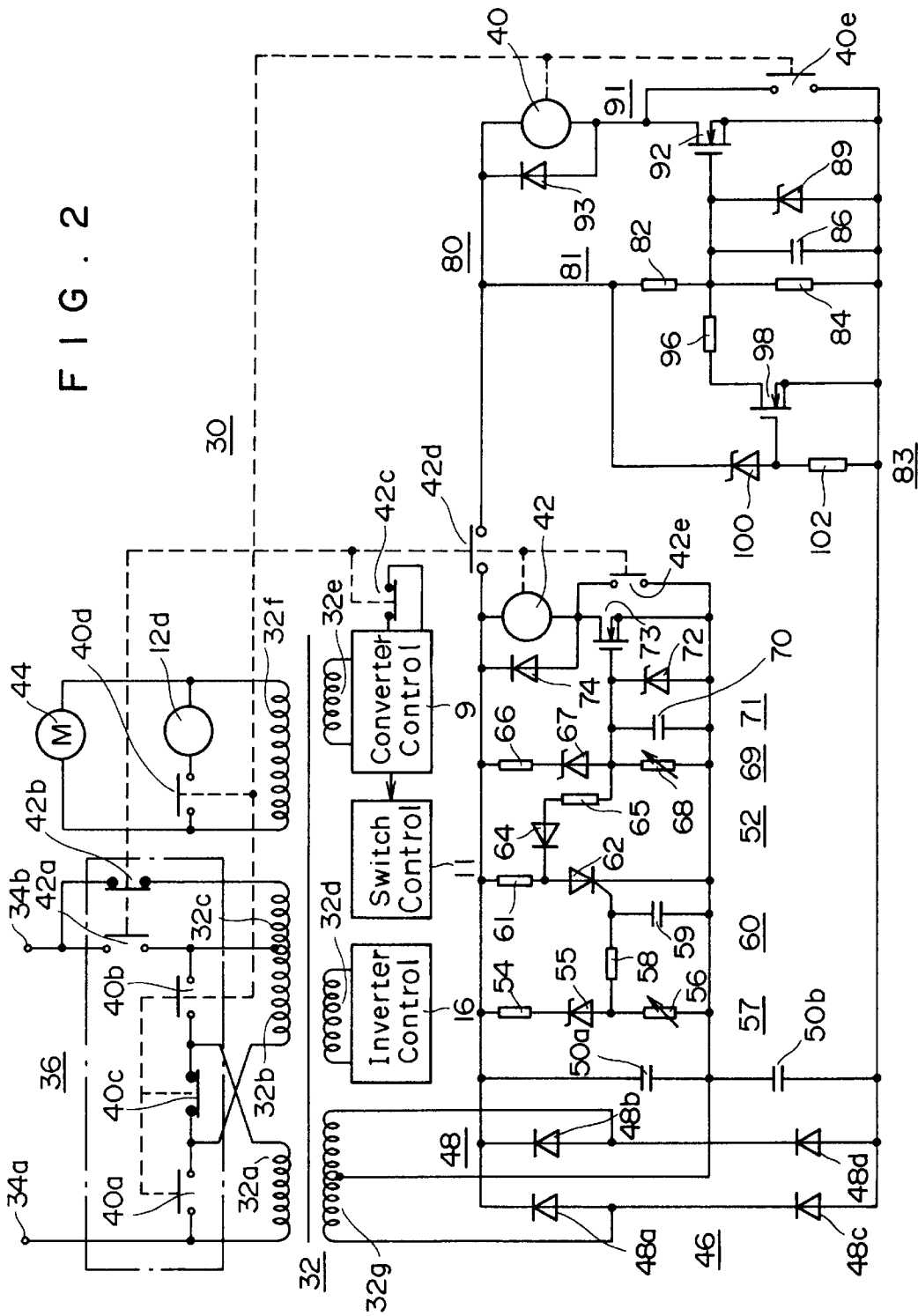
FIG. 2 is a circuit diagram of a control unit used in the DC power supply apparatus shown in FIG. 1.

The control unit 30 may be configured as shown in FIG. 2. The control unit 30 includes a control transformer 32. The control transformer 32 includes three primary windings 32a, 32b and 32c. The primary windings 32a and 32b have the same number of turns. The primary winding 32c is connected in series with the primary winding 32b and has a smaller number of turns that the primary winding 32b.

The primary windings 32a, 32b and 32c are connected to control unit input terminals 34a and 34b through a second switching circuit 36. The control unit input terminals 34a and 34b are respectively connected through the switches 2a and 2b to the input terminals 1a, and 1b of the DC power supply apparatus.

The second switching circuit 36 includes normally open contacts 40a and 40b and a normally closed contact 40c. The normally open contact 40a is connected between one end of the primary winding 32a connected to the control unit input terminal 34a and one end of the primary winding 32b. The normally open contact 40b is connected between the other end of the primary winding 32b connected to the primary winding 32c and the other end of the primary winding 32a. The normally closed contact 40c is connected between the normally open contacts 40a and 40b.

With the normally open contacts 40a and 40b opened and with the normally closed contact 40c closed, the primary windings 32a, 32b and 32c are connected in series. If the normally open contacts 40a and 40b are closed, with the normally closed contact 40c opened, the primary windings 32a and 32b are connected in parallel. The normally open contacts 40a and 40b are closed and the normally closed contact 40c is opened when current flows through a later-described relay drive coil 40.

The second switching circuit 36 includes further a normally open contact 42a and a normally closed contact 42b. The normally open contact 42a is connected between the junction of the primary windings 32b and 32c and the control unit input terminal 34b. The normally closed contact 42b is connected between the other end of the primary winding 32c and the control unit input terminal 34b. The normally open contact 42a and the normally closed contact 42b are closed and opened, respectively, when current flows through a relay drive coil 42 which will be described later.

When no current flows through the relay drive coils 40 and 42, the primary windings 32a, 32b and 32c are connected in series between the control unit input terminals 34a and 34b. When no current flows in the relay drive coil 40, while current flows in the coil 42, the primary windings 32a and 32b are connected in series between the control unit input terminals 34a and 34b. When current flows in both of the relay drive coils 40 and 42, the primary windings 32a and 32b are connected in parallel between the control unit input terminals 34a and 34b.

The control transformer 32 has four secondary windings 32d, 32e, 32f and 32g. The voltages induced in the secondary windings 32d and 32e are supplied to the inverter control circuit 16 and to the voltage-reducing converter control circuit 9, respectively, for operating them. In the respective control circuits 16 and 9, the applied AC voltages are converted into DC voltages.

A normally closed contact 42c, which is opened when current flows through the relay drive coil 42, is connected to the converter control circuit 9. With the normally closed contact 42c opened, the converter control circuit 9 is operated to enable the IGBT 5 during a time period of from a time $t_1$ to time $t_2$, as shown in FIG. 3(b). Thereafter, the converter control circuit operates the switch control circuit 11, as shown in FIG. 3(c). The time $t_1$ is a time a predetermined time period after a time $t_0$, at which an input voltage is applied to the input terminals 1a–1c, as shown in FIGS. 3(a) and 3(b).

On the other hand, if the normally closed contact 42c is closed, the converter control circuit 9 is enabled at the time $t_1$ and continues to operate thereafter, as shown in FIGS. 4(a) and 4(b). In this case, the switch control circuit 11 is not enabled, so that the thyristor 10 remains nonconductive.

The secondary winding 32f supplies an operating voltage to accessories of the DC power supply apparatus, such as a motor 44 for driving a fan for cooling heat-generating components of the apparatus, such as the inverters 14a and 14b and the reactors 7, 26a and 26b. If the DC power supply apparatus is used for an arc welder, a motor (not shown) for feeding a wire in the arc welder is connected in parallel with the motor 44.

A series combination of a relay drive coil 12d and a normally open contact 40d is connected in parallel with the motor 44. When current flows through the relay drive coil 12d, the normally open contacts 12b and 12c are closed and the normally closed contact 12a is opened. The normally open contact 40d is closed when current flows through the relay drive coil 40.

The secondary winding 32g of the control transformer 32 is connected to the comparator circuit 46.

The numbers of turns of the primary windings 32a, 32b and 32c and the numbers of turns of the secondary windings 32d, 32e, 32f and 32g are selected such that the voltages induced in the secondary windings 32d, 32e, 32f an 32g when the third voltage of 575 V is applied between the control unit input terminals 34a and 34b, with the primary windings 32a, 32b and 32c connected in series, are equal to the corresponding voltages induced when the second voltage is applied, with the primary windings 32a and 32b are connected in series, and also to the corresponding voltages induced when the first voltage is applied between the control unit input terminals 34a and 34b, with the primary windings 32a and 32b connected in parallel.

The comparator circuit 46 includes a rectifier circuit 48, which full-wave rectifies the voltage induced in the secondary winding 32g. The rectifier circuit 48 includes diodes 48a and 48b having their anodes connected to the respective ends of the secondary winding 32g, and diodes 48c and 48d having their cathodes connected to the respective ends of the secondary winding 32g. The junction of the cathodes of the diodes 48a and 48b provides one output node of the rectifier circuit 48, while the junction of the anodes of the diodes 48c and 48d provides the other output node of the rectifier circuit 48.

The rectified voltage developed between the output nodes of the rectifier circuit 48 is smoothed by smoothing capacitors 50a and 50b. The capacitor 50a is connected between the junction of the cathodes of the diodes 48a and 48b and an intermediate tap on the secondary winding 32g. The smoothing capacitor 50b is connected between the junction of the anodes of the diodes 48c and 48d and the intermediate tap on the secondary winding 32g.

The voltage developed across the smoothing capacitor 50a is applied to a first comparator section 52 of the comparator circuit 46, which includes a series combination 57 of a resistor 54, a zener diode 55 and a variable resistor 56. The series combination 57 is connected in parallel with the smoothing capacitor 50a. The resistance of the resistor 54, the resistance of the variable resistor 56 and the rating of the zener diode 55 are selected such that the zener diode 55 is rendered conductive when the voltage appearing between the intermediate tap on the winding 32g and the anode of the diode 48a is equal to or larger than a high-voltage-indicative value. The high-voltage-indicative value is the value of the voltage which would be developed between the intermediate tap on the winding 32g and the anode of the diode 48a when a voltage of, e.g. 510 V, which is between the lower limit of the variation range of the third AC voltage of 575 V and the higher limit of the variation range of the highest second AC voltage of 460 V, is applied between the control unit input terminals 34a and 34b.

A series combination of resistor 58 and a capacitor 59 is connected in parallel with the variable resistor 56. Also, a series combination of a resistor 61 and a thyristor 62 is connected in parallel with the smoothing capacitor 50a. The voltage across the capacitor 59 is applied between the gate and cathode of the thyristor 62.

The first comparator section 52 includes further a series combination 69 of a resistor 66, a zener diode 67 and a variable resistor 68, which is connected in parallel with the smoothing capacitor 50a. The resistance of the resistor 66, the resistance of the variable resistor 68 and the characteristics of the zener diode 67 are selected such that the zener diode 67 is rendered conductive when a voltage equal to or larger than a low-voltage-indicative value, which is smaller than the high-voltage-indicative value, appears between the intermediate tap on the secondary winding 32g and the anode of the diode 48a.

The junction of the anode of the zener diode 67 and the variable resistor 68 is connected through a resistor 65 to the anode of a diode 64, of which the cathode is connected to the junction of the anode of the thyristor 62 and the resistor 61.

A parallel combination of a capacitor 70 and a zener diode 72 is connected in parallel with the variable resistor 68. Also, a series combination of the relay drive coil 42 and a semiconductor switching device, e.g. an FET 73 is connected across the smoothing capacitor 50a. The FET 73 has its drain-source conduction path connected in series with the coil 42. The voltage across the parallel combination of the zener diode 72 and the capacitor 70 is applied between the gate and source of the FET 73.

A diode 74 is connected in parallel with the relay drive coil 42. The relay drive coil 42, when current flows therethrough, closes the normally open contact 42a, opens the normally closed contact 42b, closes a normally open contact 42e, which is connected in parallel with the drain-source conduction path of the FET 73, opens the normally closed contact 42c, and closes a normally open contact 42d which will be described later.

The resistor 54, the zener diode 55, the resistor 58 and the capacitor 59 form a time constant circuit or a delay circuit, e.g. an integrator circuit 60. Similarly, the resistor 66, the zener diode 67 and the capacitor 70 form a time constant circuit or a delay circuit, e.g. an integrator circuit 71. The time constant of the integrator circuit 60 is smaller than the time constant of the integrator circuit 71. Accordingly, the time required for the voltage across the capacitor 59 to reach the value enough to render the thyristor 62 conductive after the application of an input voltage to the input terminals 1a–1c is shorter than the time required for the voltage across the capacitor 70 to reach the value enough to render the FET 73 conductive.

When the third, high, voltage is applied to the input terminals 1a–1c, both the zener diodes 55 and 67 are rendered conductive, and the charging of the capacitors 59 and 70 starts. The voltage across the capacitor 59 reaches the value enough to render the thyristor 62 conductive before the voltage across the capacitor 70 reaches the value enough to render the FET 73 conductive. This causes the charge on the capacitor 70 to be discharged through the resistor 65, the diode 64 and the thyristor 62. As a result, the FET 73 remains nonconductive, and, therefore, current does not flow through the relay drive coil 42, which, in turn, keeps the normally open contacts 42a, 42d and 42e open and keeps the normally closed contacts 42b and 42c closed.

When the second or the first AC voltage is applied to the input terminals 1a–1c, the zener diode 67 is rendered conductive, but the zener diode 55 remains nonconductive. Accordingly, the voltage across the capacitor 70 can increase to the voltage enough to render the FET 73 conductive. Then, the FET 73 is rendered conductive, so that current flows through the relay drive coil 42, which causes the normally open contacts 42a, 42d and 42e to be closed and causes the normally closed contacts 42b and 42c to be opened. The closure of the normally open contact 42e causes the latch-in of the relay drive coil 42, so that the normally open contacts 42a, 42d and 42e remain closed and the normally closed contacts 42b and 42c remain open even when the voltage induced in the secondary winding 32g changes.

The voltage across the series combination of the capacitors 50a and 50b is applied through the normally open contact 42d to a second comparator section 80. As described above, since the normally open contact 42d is closed when the second or the first AC voltage is applied to the input terminals 1a–1c, the second comparator section 80 operates when the second or the first voltage is applied to the input terminals 1a–1c.

The second comparator section 80 includes a series combination 81 of resistors 82 and 84. The series combination 81 is connected in parallel with the series combination of the capacitors 50a and 50b through the contact 42d. A capacitor 86 is connected in parallel with the resistor 84. The resistors 82 and 84 and the capacitor 86 form an integrator circuit. A zener diode 89 is connected in parallel with the capacitor 86.

The second comparator section 80 includes further a series combination 91 of the relay drive coil 40 and a semiconductor switching device 92, e.g. an FET, which is connected through the normally open contact 42d across the series combination of the capacitors 50a and 50b. The FET 92 has its drain-source conduction path connected in series with the relay drive coil 40. The capacitor 86 is connected between the gate and source of the FET 92.

Thus, when the capacitor 86 is charged and the voltage across it reaches a predetermined value, the FET 92 conducts current to flow through the relay drive coil 40. The relay drive coil 40, when current flows through it, closes the normally open contacts 40a, 40b and 40d, opens the normally closed contact 40c, and closes a normally open contact 40e which is connected in parallel with the drain-source conduction path of the FET 92.

A diode 93 is connected in parallel with the relay drive coil 40.

A series combination of a resistor 96 and a semiconductor switching device 98, e.g. an FET with its drain-source conduction path connected in series with the resistor 96, is connected in parallel with the capacitor 86. A series combination of a zener diode 100 and a resistor 102 is connected in parallel with the series combination 81 of the resistors 82 and 84. The junction of the zener diode 100 and the resistor 102 is connected to the gate of the FET 98. When the zener diode 100 is rendered conductive, the FET 98 becomes conductive, resulting in the discharging of the capacitor 86. The characteristic of the zener diode 100 and the resistance of the resistor 102 are selected such that the zener diode 100 is rendered conductive when the second AC voltage is applied to the input terminals 1a–1c.

Since the capacitor 86 discharges when the second voltage is applied to the input terminals 1a–1c, the FET 92 remains nonconductive, the normally open contacts 40a, 40b and 40d remain open, and the normally closed contact 40c remains closed.

With the above-described arrangement of the control unit 30, the DC power supply apparatus operates as follows.

With no input AC voltage applied to the input terminals 1a–1c, the normally closed contact 12a is closed, the normally open contacts 12b and 12c are open, and the smoothing capacitors 8a and 8b are connected in series with each other, as is shown in FIG. 1. Also, the normally open contacts 40a, 40b and 42a are open, and the normally closed contacts 40c and 42b are closed. Thus, the three primary windings 32a, 32b and 32c of the control transformer 32 of the control unit 30 are connected in series.

If the third voltage is applied to the input terminals 1a–1c, and the switches 2a, 2b and 2c are closed, no current flows through the relay drive coil 42, as previously described, and, therefore, the respective normally open contacts and normally closed contacts remain in their respective previous states. As a result, the smoothing capacitors 8a and 8b remain connected in series. Then, a voltage adequate for operating the inverter control circuit 16 is induced in the secondary winding 32d. The inverter control circuit 16 operates normally to make the inverters 14a and 14b operate normally. A voltage adequate for operating the converter control circuit 9 is induced in the secondary winding 32e. Since the normally closed contact 42c is closed, only the voltage-reducing converter 4 operates. Also, a voltage adequate for operating the motor 44 is induced in the secondary winding 32f, so that the motor 44 can operate normally.

If the voltage applied to the input terminals 1a–1c is the second voltage, current flows through the relay drive coil 42, so that the normally closed contact 42b is opened and the normally open contact 42a is closed. In this case, since no current flows through the relay drive coil 40, the normally open contact 40d remains open, and, therefore, no current flows through the relay drive coil 12d. This maintains the normally closed contact 12a to be closed, the normally open contacts 12b and 12c to be open, and the smoothing capacitors 8a and 8b to be connected in series.

The normally open contact 42a is closed and the normally closed contact 42b is opened. Since no current flows through the relay coil 40, the normally closed contact 40c remains closed, whereas the normally open contacts 40a and 40b remain open. Accordingly, the primary windings 32a and 32b are connected in series, and the second voltage is applied to this series connected primary windings 32a and 32b. Then, a voltage adequate for operating the inverter control circuit 16 is induced in the secondary winding 32d, and voltages adequate for operating the converter control circuit 9 and the motor 44 are induced in the secondary windings 32e and 32f, respectively. As a result, the inverter control circuit 16, the converter control circuit 9 and the motor 44 can operate properly. In this case, as described previously, since the normally closed contact 40c is open, the voltage-reducing converter 4 operates only for a predetermined time period before the thyristor 10 becomes conductive.

This causes changes in the voltage induced in the secondary winding 32g, but the normally open contacts 42a and 42d remain closed, while the normally closed contacts 42b and 42c remain open because the relay drive coil 42 is latched due to the action of the normally open contact 42e.

If the voltage applied to the input terminals 1a–1c is the first voltage, the normally open contact 42d is closed, so that the second comparator section 80 starts to operate. Current flows through the relay drive coil 40 to thereby close the normally open contact 40d, which permits current to flow through the relay drive coil 12d. As a result, the normally closed contact 12a is opened, and the normally open contacts 12b and 12c are closed. Thus, the smoothing capacitors 8a and 8b are connected in parallel.

Because current flows through the coil 40, the normally open contacts 40a and 40b are closed, and the normally closed contact 40c is opened. This permits current to flow through the relay drive coil 42 to thereby close the normally open contact 42a and open the normally closed contact 42b. Accordingly, the first voltage is applied to the two primary windings 32a and 32b, which are now connected in parallel. Voltages adequate for operating the inverter control circuit 16 and the converter control circuit 9 are induced in the secondary windings 32d and 32e, respectively. Also, a voltage adequate for operating the motor 44 and the relay coil 12d is induced in the secondary winding 32f. In this way, the inverter control circuit 16, the converter control circuit 9 and the motor 44 can start operating. Since the normally closed contact 42c is open, the thyristor 10 becomes conductive after the voltage-reducing converter 4 operates for a predetermined time period.

In this case, the voltage induced in the secondary winding 32g changes, but the normally open contacts 42a and 42d remain closed and the normally closed contacts 42b and 42c remain open because the drive relay coil 42 is latched by the action of the normally open contact 42e. Also, the normally open contacts 40a, 40b and 40d are kept closed, while the normally closed contact 40c is kept open because the drive relay coil 40 is latched due to the action of the normally open contact 40e.

As is understood from the description, whichever voltage, namely, the first, the second or the third voltage, is applied to the input of the DC power supply apparatus, it can properly operate as a power supply for, for example, a DC arc welder. In this case, no separate power supply is required for operating the motor 44 and other accessories. Furthermore, low withstand voltage semiconductor switching devices can be used in the inverters 14a and 14b.

In the above described embodiment, the first switching circuit 12 is formed of contact elements, namely, the normally closed contact 12a and the normally open contacts 12b and 12c. However, as shown in FIG. 5, which shows a second embodiment of the present invention, the contact elements may be replaced by contactless elements, e.g. semiconductor devices. Specifically, a diode 121a may be substituted for the normally closed contact 12a of the first switching circuit 12 used in the circuit shown in FIG. 1, and thyristors 121b and 121c may be substituted for the normally closed contacts 12b and 12c, respectively, as shown in FIG. 5. In such a case, in place of the relay drive coil 12d, a driver (not shown) for providing drive signals for the thyristors 121b and 121c is used. With no drive signals applied to the thyristors 121b and 121c, they are nonconductive, and the diode 121a is conductive, so that the smoothing capacitors 8a and 8b are connected in series. When the drive signals are applied to the thyristors 121b and 121c, they become conductive, while the diode 121a is made nonconductive. Accordingly, the capacitors 8a and 8b are connected in parallel.

The control unit 30 shown in FIG. 2 can be used in the second embodiment by simply substituting the driver for the relay drive coil 12d.

In the above-described embodiments, the first and second comparator sections are formed, using zener diodes and FETs, but they may be provided by using operational amplifiers. Further, choppers may be used in place of the inverters 14a and 14b.

What is claimed is:

1. A DC power supply apparatus for arc-utilizing apparatus, comprising:

a power supply input terminal adapted to selectively receive a first AC voltage, a second AC voltage about twice as high as said first AC voltage, and a third AC voltage higher than said second AC voltage;

a rectifier circuit for rectifying the AC voltage applied to said power supply input terminal;

a voltage-reducing converter for receiving and reducing an output voltage of said rectifier circuit;

a switch connected in parallel with said voltage-reducing converter;

first and second smoothing capacitors;

a first switching circuit for selectively connecting said first and second smoothing capacitors in series and in parallel to said voltage-reducing converter;

first and second DC-to-high-frequency converting circuits connected to said first and second smoothing capacitors, respectively;

first and second transformers to which outputs of said first and second DC-to-high-frequency converting circuits are respectively applied;

a high-frequency-to-DC converter for converting high-frequency outputs of said first and second transformers into DC voltages; and a control unit for rendering said voltage-reducing converter operative and also causing said first switching circuit to connect said first and second smoothing capacitors in series when the voltage applied to said power supply input terminal is said third AC voltage, said control unit causing said switch to be closed and causing said first switching circuit to connect said first and second smoothing capacitors in series when the voltage applied to said power supply input terminal is said second AC voltage, and causing said switch to be closed and causing said first switching circuit to connect said first and second smoothing capacitors in parallel when the voltage applied to said power supply input terminal is said first AC voltage.

2. The DC power supply apparatus according to claim 1 wherein said control unit renders said voltage-reducing converter operative only for a predetermined time period and, thereafter, causing said switch to be closed when the voltage applied to said power supply input terminal is said first or second AC voltage.

3. The DC power supply apparatus according to claim 1 wherein said control unit comprises:

control unit input terminals between which said first, second and third AC voltages are selectively applied;

a control transformer having first, second and third primary windings, and having first and second secondary windings;

a second switching circuit for selectively connecting between said control unit input terminals, said first, second and third primary windings in series, said first and second primary windings in series, and said first and second primary windings in parallel;

an accessory powered from said first secondary winding;

a comparator circuit comprising a first comparator section for causing said first switching circuit to connect said first and second smoothing capacitors in series, rendering said voltage-reducing converter operative, and causing said second switching circuit to connect said first, second and third primary windings of said control transformer in series when a voltage induced in said second secondary winding of said control transformer is higher than a first value between a voltage corresponding to said second AC voltage and a voltage corresponding to said third AC voltage, said comparator circuit causing said first switching circuit to connect said first and second smoothing capacitors in series, closing said switch, and causing said second switching circuit to connect said first and second primary windings of said control transformer in series when the voltage induced in said second secondary winding is lower than said first value but higher than a second value between a voltage corresponding to said first AC voltage and the voltage corresponding to said second AC voltage, said comparator circuit further causing said first switching circuit to connect said first and second smoothing capacitors in parallel, closing said switch, and causing said second switching circuit to connect said first and second primary windings in parallel when the voltage induced in said second secondary winding is lower than said second value.

4. The DC power supply apparatus according to claim 3 wherein the numbers of turns of said first, second and third primary windings and said first secondary winding of said control transformer are selected such that a voltage of the same magnitude is induced in said first secondary winding when said third AC voltage is applied between said control unit input terminals of said control unit with said first, second and third primary windings connected in series between said control unit input terminals, when said second AC voltage is applied between said control unit input terminals with said first and second primary windings connected in series between said control unit input terminals, and when said first AC voltage is applied between said control unit input terminals with said first and second primary windings connected in parallel between said control unit input terminals.

5. The DC power supply apparatus according to claim 3 wherein said second switching circuit connects said first, second and third primary windings in series between said control unit input terminals when neither first nor second switching signal is applied to said second switching circuit, connects said first and second primary windings in series between said control unit input terminals when said first switching signal is applied thereto, while said second switching signal is not applied thereto, and connects said first and second primary windings in parallel between said control unit input terminals when both said first and second switching signals are applied to said second switching circuit;

said voltage-reducing converter is operated when said first switching signal is not applied to said second switching circuit;

said switch is closed when said first switching signal is applied to said second switching circuit; and said comparator circuit includes a second comparator section which generates said first switching signal only when the voltage induced in said second secondary winding is lower than said first value, and generates said second switching signal only when said first switching signal is present and the voltage induced in said second secondary winding is lower than said second value.

6. The DC power supply apparatus according to claim 5 wherein said first comparator section is arranged to hold said first switching signal when it is generated, and said second comparator section is arranged to hold said second switching signal when it is generated.

* * * * *